(12) United States Patent
Kalinowski et al.

(10) Patent No.: US 10,793,173 B2
(45) Date of Patent: Oct. 6, 2020

(54) HALF PALLET SLED

(71) Applicant: Rehrig Pacific Company, Los Angeles, CA (US)

(72) Inventors: Dane Gin Mun Kalinowski, Foothill Ranch, CA (US); Travis James Englert, Brea, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 15/639,266

(22) Filed: Jun. 30, 2017

(65) Prior Publication Data

US 2018/0029623 A1 Feb. 1, 2018

Related U.S. Application Data

(60) Provisional application No. 62/356,869, filed on Jun. 30, 2016.

(51) Int. Cl.
| | |
|---|---|
| *B62B 3/00* | (2006.01) |
| *B62B 3/02* | (2006.01) |
| *B62B 5/00* | (2006.01) |
| *B62B 3/06* | (2006.01) |
| *B62B 3/04* | (2006.01) |
| *B62B 3/10* | (2006.01) |
| *B62B 1/10* | (2006.01) |

(52) U.S. Cl.
CPC .................. *B62B 3/02* (2013.01); *B62B 3/04* (2013.01); *B62B 3/06* (2013.01); *B62B 3/108* (2013.01); *B62B 5/0003* (2013.01); *B62B 1/10* (2013.01); *B62B 2202/90* (2013.01); *B62B 2203/21* (2013.01); *B62B 2203/29* (2013.01); *B62B 2203/70* (2013.01); *B62B 2207/02* (2013.01)

(58) Field of Classification Search
CPC .. B62B 3/04; B62B 3/001; B62B 3/02; B62B 3/0168; B62B 3/108
See application file for complete search history.

(56) References Cited

U.S. PATENT DOCUMENTS

| | | | | | |
|---|---|---|---|---|---|
| 3,963,257 | A | * | 6/1976 | Harron | B60P 1/027 280/43.12 |
| 4,712,966 | A | * | 12/1987 | Gross | B60P 3/41 108/55.3 |
| 4,884,936 | A | * | 12/1989 | Kawada | B62B 3/04 280/43.12 |
| 5,096,358 | A | * | 3/1992 | Plant | B60S 13/00 280/43.12 |
| 7,296,806 | B2 | * | 11/2007 | Borrmann | B62B 3/02 280/43.12 |

(Continued)

OTHER PUBLICATIONS

U.S. Appl. No. 15/788,967, filed Oct. 20, 2017.
U.S. Appl. No. 15/606,598, filed May 26, 2017.

*Primary Examiner* — Hau V Phan
(74) *Attorney, Agent, or Firm* — Carlson, Gaskey & Olds, P.C.

(57) ABSTRACT

A pallet sled includes a sled base having wheels. A fork tine assembly extends from the sled base and includes a pair of fork tines. At least one of the pair of fork tines is configured to be secured to a base of a hand cart, such as with a slot or recess. The hand cart can be carried by the fork tine while the fork tines are supporting a pallet loaded with goods thereon.

18 Claims, 17 Drawing Sheets

(56) References Cited

U.S. PATENT DOCUMENTS

| | | | |
|---|---|---|---|
| 7,490,847 B2 * | 2/2009 | Dahl | B60B 3/001 |
| | | | 211/153 |
| 7,856,932 B2 | 12/2010 | Stahl et al. | |
| 7,987,797 B2 | 8/2011 | Stahl et al. | |
| 7,988,405 B2 | 8/2011 | Ellington | |
| 8,011,677 B1 | 9/2011 | Ellington et al. | |
| 8,075,244 B2 | 12/2011 | Ellington | |
| 8,282,111 B2 | 10/2012 | Hailston et al. | |
| 8,360,443 B2 | 1/2013 | Ellington | |
| 8,376,089 B2 * | 2/2013 | Stone | B66F 9/06 |
| | | | 180/19.2 |
| 8,776,697 B1 | 7/2014 | O'Connell | |
| 8,894,076 B2 | 11/2014 | Hailston et al. | |
| 8,950,759 B2 | 2/2015 | Thorsen et al. | |
| 9,051,161 B2 * | 6/2015 | Luschi | B62B 3/0618 |
| 9,260,125 B2 | 2/2016 | Ellington et al. | |
| 2002/0190489 A1 * | 12/2002 | Lee | B62B 3/0625 |
| | | | 280/43.12 |
| 2006/0181039 A1 * | 8/2006 | Fridlington, Jr. | B62B 3/0618 |
| | | | 280/43.12 |
| 2008/0181760 A1 * | 7/2008 | Frahm | B62B 3/06 |
| | | | 414/785 |
| 2009/0183953 A1 | 7/2009 | Ellington | |
| 2009/0185890 A1 | 7/2009 | Ellington | |
| 2010/0295261 A1 | 11/2010 | Ellington | |
| 2011/0171000 A1 | 7/2011 | Hailston | |
| 2013/0202400 A1 | 8/2013 | Richard et al. | |
| 2013/0223962 A1 | 8/2013 | Ellington et al. | |
| 2015/0225215 A1 | 8/2015 | King et al. | |
| 2016/0368747 A1 * | 12/2016 | O'Connell | B62B 3/0618 |
| 2017/0240194 A1 | 8/2017 | Kalinowski et al. | |
| 2017/0297881 A1 | 10/2017 | King et al. | |

\* cited by examiner

HALF PALLET SLED

BACKGROUND

The development of direct store delivery (DSD) systems increases delivery efficiencies across several industries including Beverage and Food Service by reducing the amount of time and labor a driver needs to deliver product (raw goods, finished goods, etc.) to the restaurant or store.

The DSD system allows the driver to transport a loaded pallet directly from the trailer to inside the store without having to down stack product onto a hand truck and making multiple trips back and forth. The product can then be merchandised on the shelf or in the cooler or stored in the back room directly on the pallet. The DSD systems have optimized equipment (electric lift and/or sled) with a small footprint and maneuverability to fit in tight aisles, hallways, and coolers to maximize efficiency.

In some cases as found in Food Service industry, the store clerk/owner or driver may prefer not to use the equipment in the store due to the number of people and how crowded the store may be. The driver may bring a secondary piece of equipment such as a hand truck with the lift or sled and pallet load to the store front, then down stack the product onto the hand truck to deliver in the store. While this is not the most efficient delivery method, the driver will need to comply with the store's request to not bring the larger equipment inside.

SUMMARY

A delivery system as described herein allows the delivery driver to transport the secondary equipment (i.e. hand truck) with the primary piece of equipment (i.e. electric lift or sled) by integrating receivers into the primary equipment's fork structure. The design allows the secondary equipment to be stored in several configurations depending on delivery conditions. The driver does not have to carry/drag/roll the secondary piece of equipment. The driver can bring all necessary equipment with the pallet load at once without making multiple trips back to the trailer. Several example embodiments are described below.

DETAILED DESCRIPTION OF PREFERRED EMBODIMENTS

Figure 1:
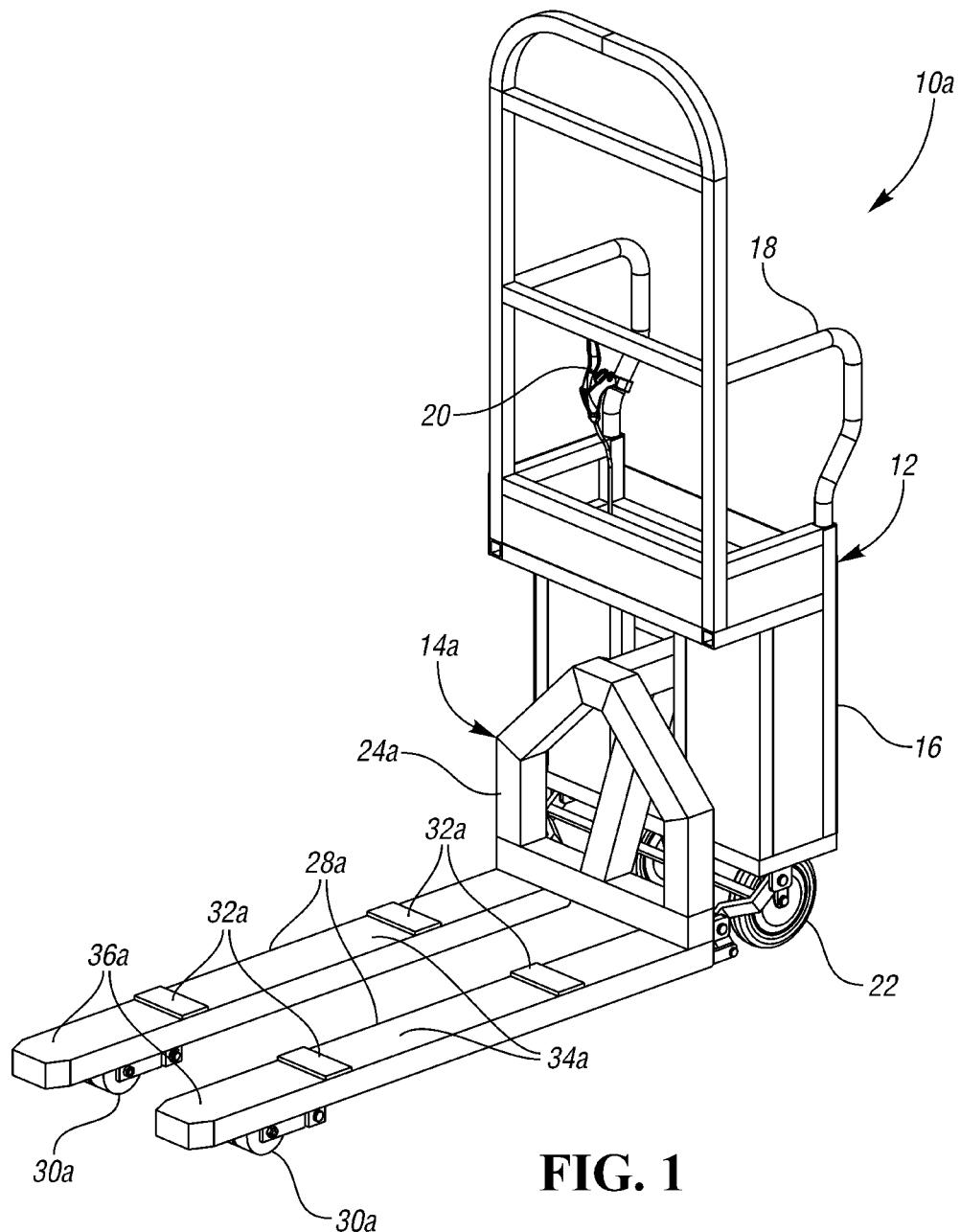
FIG. 1 is a perspective view of a pallet sled according to one embodiment.

FIG. 1 shows a pallet lift or sled 10a including a lift assembly 12 and a fork tine assembly 14a according to a first embodiment. The lift assembly 12 includes a base 16 with upright handles 18. Other handle arrangements could also be used, but the upright handles 18 shown reduce the footprint of the lift assembly 12 and increase the maneuverability of the sled 10a in tight spaces. An actuator 20 on one of the handles 18 permits the operator to activate the lift assembly 12. Wheels 22 are mounted below the base 16. The lift assembly 12 includes an electric or hydraulic lift mechanism for raising the fork tine assembly 14a.

The fork tine assembly 14a includes a support structure 24a connecting the lift assembly 12 to the fork tines 28a. The tines 28a are supported by pivoting wheels 30a (as is known). In this embodiment, there are a pair of spaced-apart spacers 32a protruding upward from the uppermost surface of each tine 28a. A central recessed area 34a is defined between each pair of spacers 32a on each tine 28a. A front recessed area 36a is defined in front of each pair of spacers 32a on each tine 28a.

Figure 2:
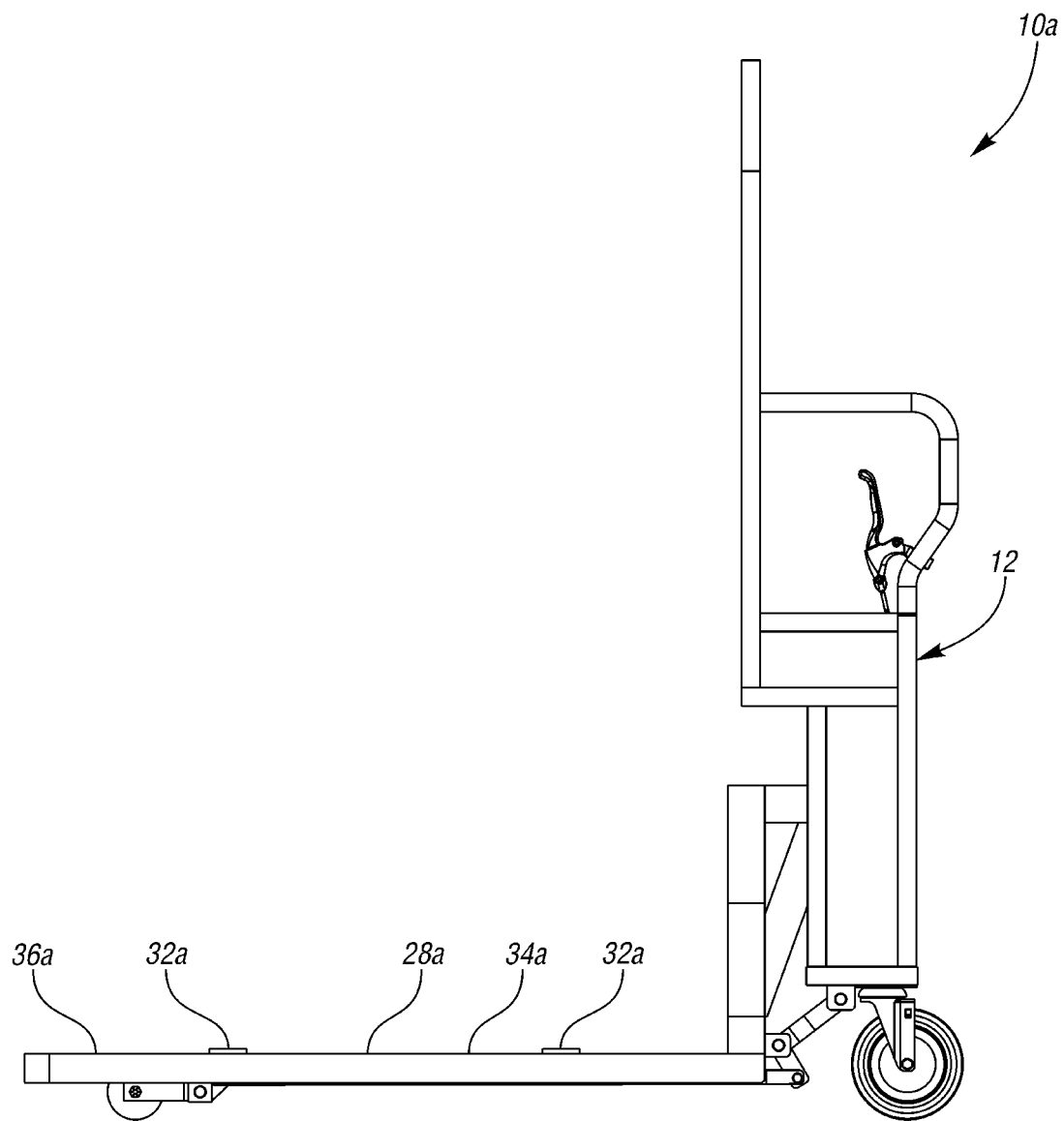
FIG. 2 is a side view of the pallet sled of FIG. 1.

FIG. 2 is a side view of the sled 10a. As shown, the spacers 32a project upward higher than an uppermost surface of the tines 28a to define the central recessed area 34a and the front recessed area 36a.

Figure 3:
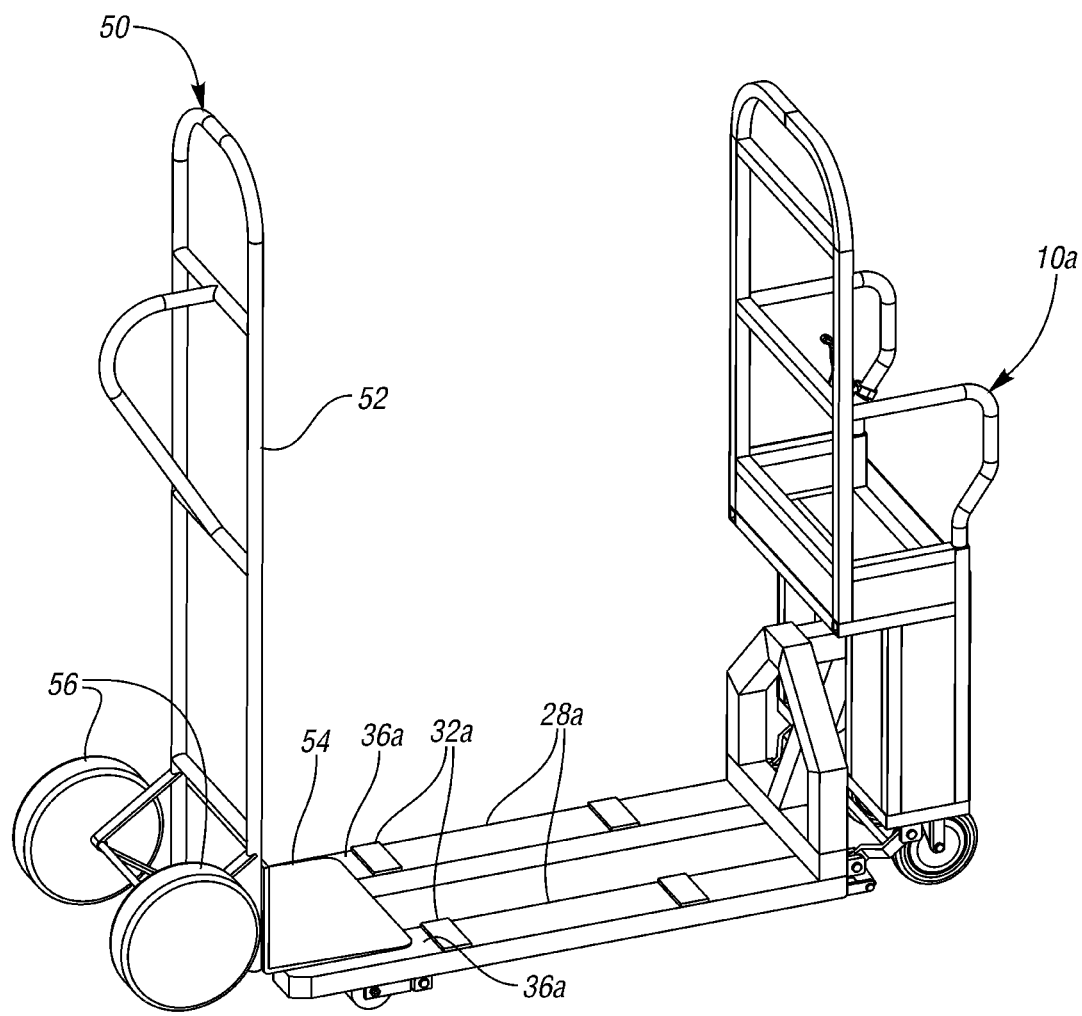
FIG. 3 shows a hand cart on the front of the tines of the pallet sled of FIG. 1.

As shown in FIG. 3, a hand cart 50 has a frame 52, planar base 54 and wheels 56. The base 54 can be received on the front recessed areas 36a formed at the fronts of the tines 28a, forward of the front spacers 32a on each tine 28a. The base 54 has a thickness that is approximately the same or slightly less than the height of the spacers 32a.

Figure 4:
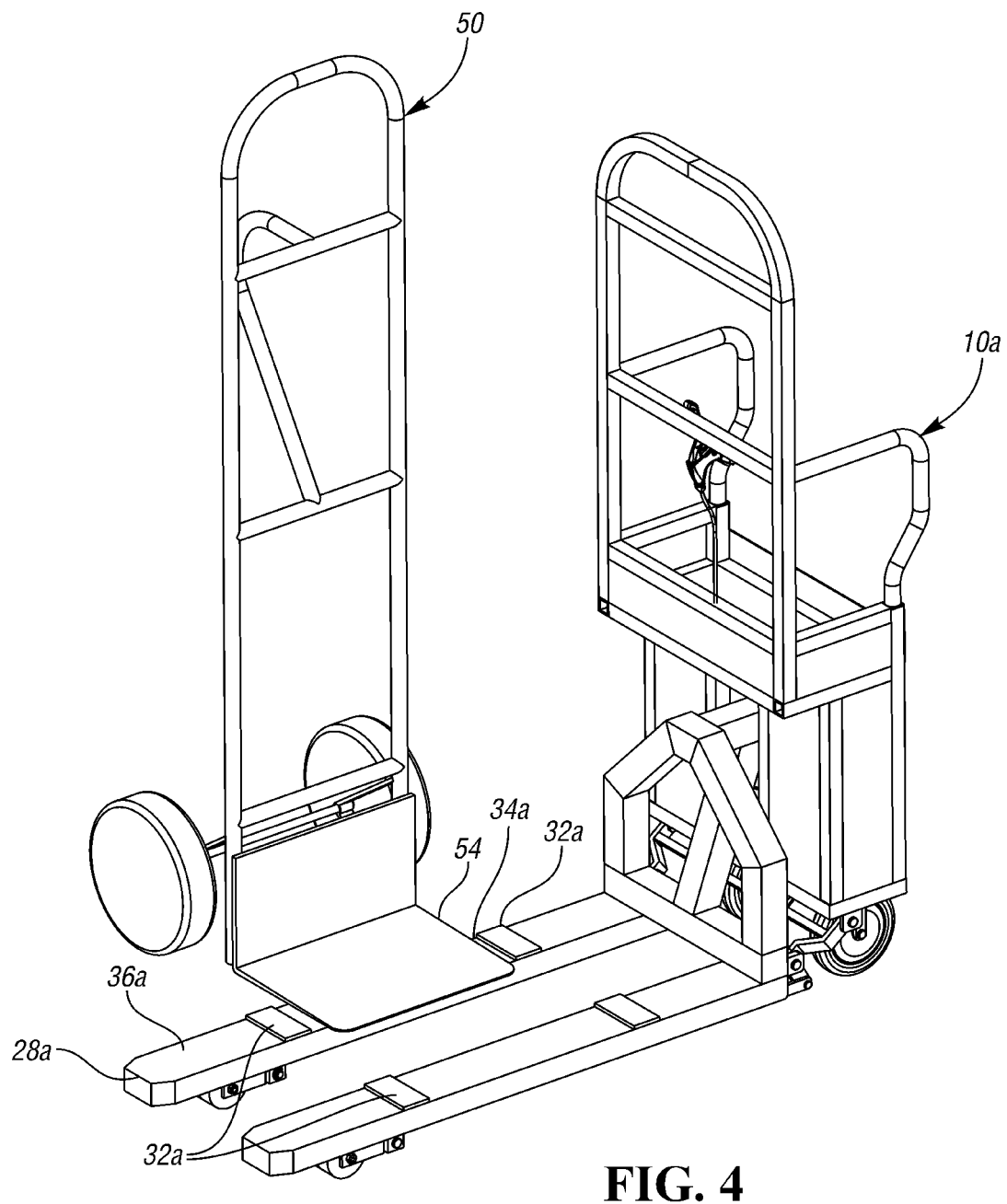
FIG. 4 shows the hand cart and pallet sled of FIG. 3 with the hand cart in a side position.

Referring to FIG. 4, the base 54 of the hand cart 50 can also be received in either of the central recessed areas 34a, between the spacers 32a. The hand cart 50 can be placed in either position while a pallet is supported on the tines 28a.

Figure 5:
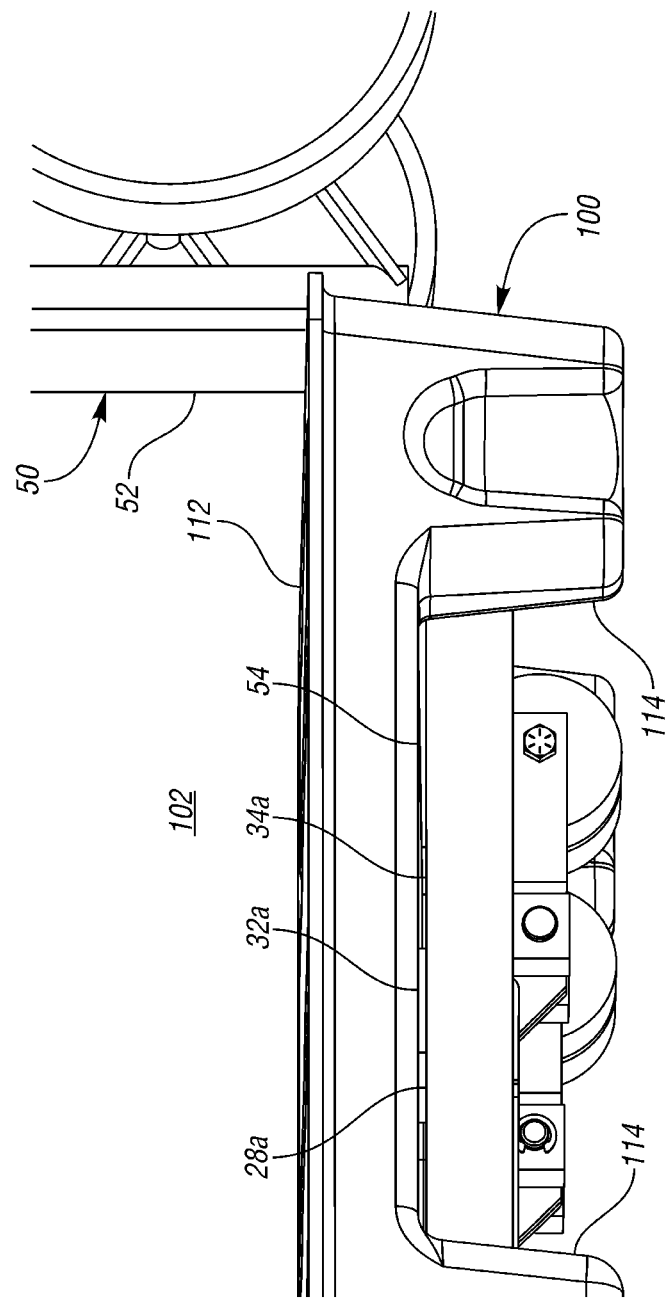
FIG. 5 shows a pallet received on the pallet sled and hand cart of FIG. 3.

FIG. 5 shows a pallet 100 having a deck 112 and supports 114. Goods 102 are stacked on the deck 112. The pallet 100 is received on the tines 28a, which in the disclosed embodiments are received between the columns 114. As shown, the base 54 of the hand cart 50 is slid between the deck 112 of the pallet 100 and the front recessed areas 34a of the tines 28a. The base 54 can be slid between the deck 112 and the tines 28a after the loaded pallet 100 is placed over the tines 28a before the tines 28a are lifted (it may be possible after the tines 28a are lifted, depending on the pallet 100 and the height of the spacers 32a). The base 54 has a thickness that is approximately the same or slightly less than the height of the spacers 32a. The goods 102 are shown as a monolith, but would in practice be a plurality of smaller objects, such as smaller containers (boxes, crates, etc), several of which could be transported on the cart 50 at once. In use, the driver can transport the pallet 100, the goods 102 and the cart 50 from the delivery truck to the store front (or other intermediate location). There, the driver can downstack some of the goods 102 from the pallet 100 and sled 10a to the cart 50. The driver then uses the cart 50 to bring the goods 102 to the desired location (e.g. shelves, refrigerator unit, etc).

Figure 6:
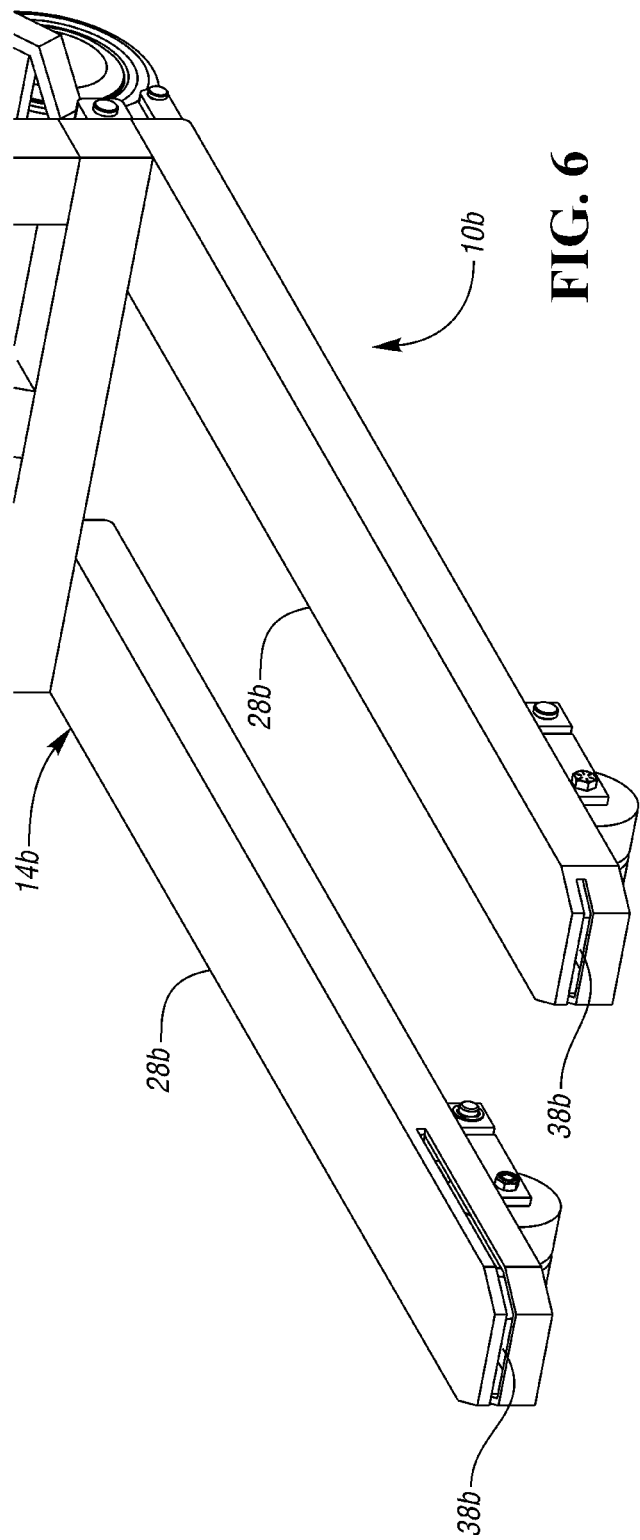
FIG. 6 is a perspective view of the tines of a pallet sled according to a second embodiment.
Figure 7:
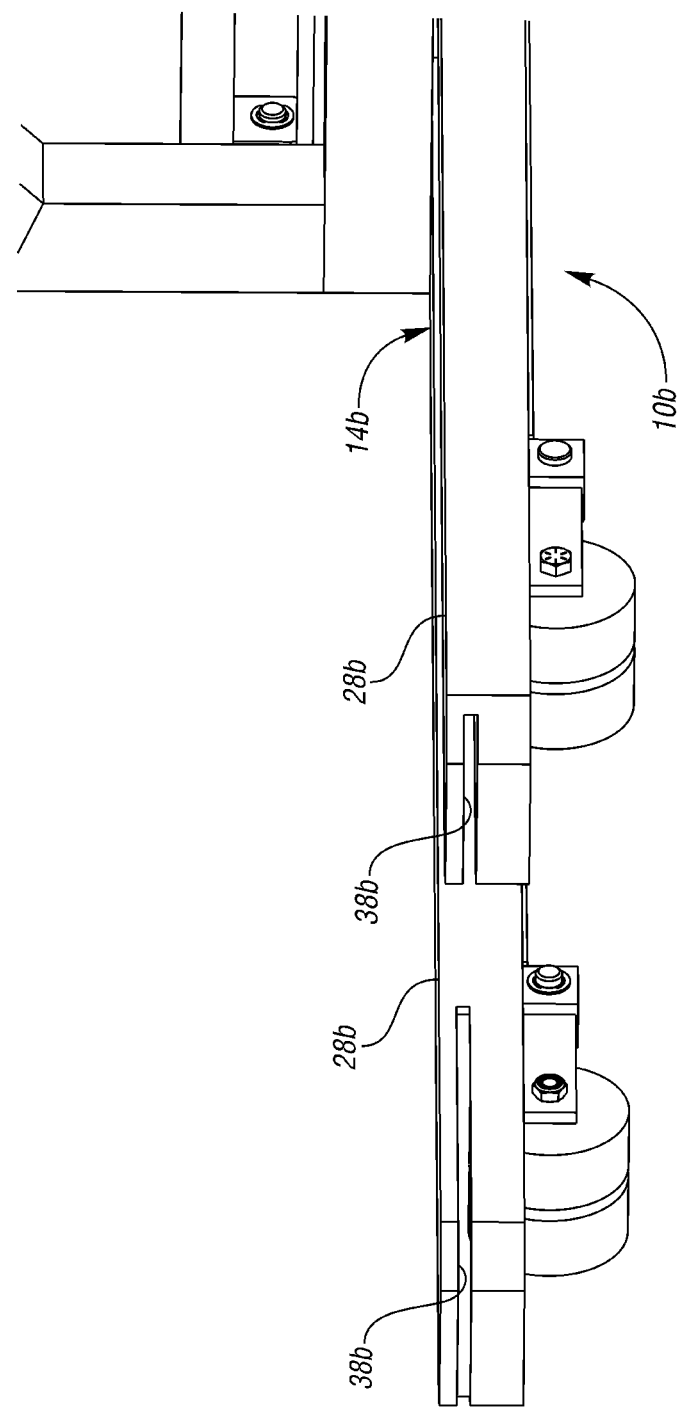
FIG. 7 is another front perspective view of the tines of FIG. 6.

FIGS. 6 and 7 show a sled 10b according to another embodiment, with an alternate fork tine assembly 14b. The fork tines 28b each include a horizontal slot forward 38b at the front end thereof. The forward slots 38b are aligned with one another. In the embodiment shown, the forward slots 38b are open forward and inward (toward one another) and are closed to the exterior.

Figure 8:
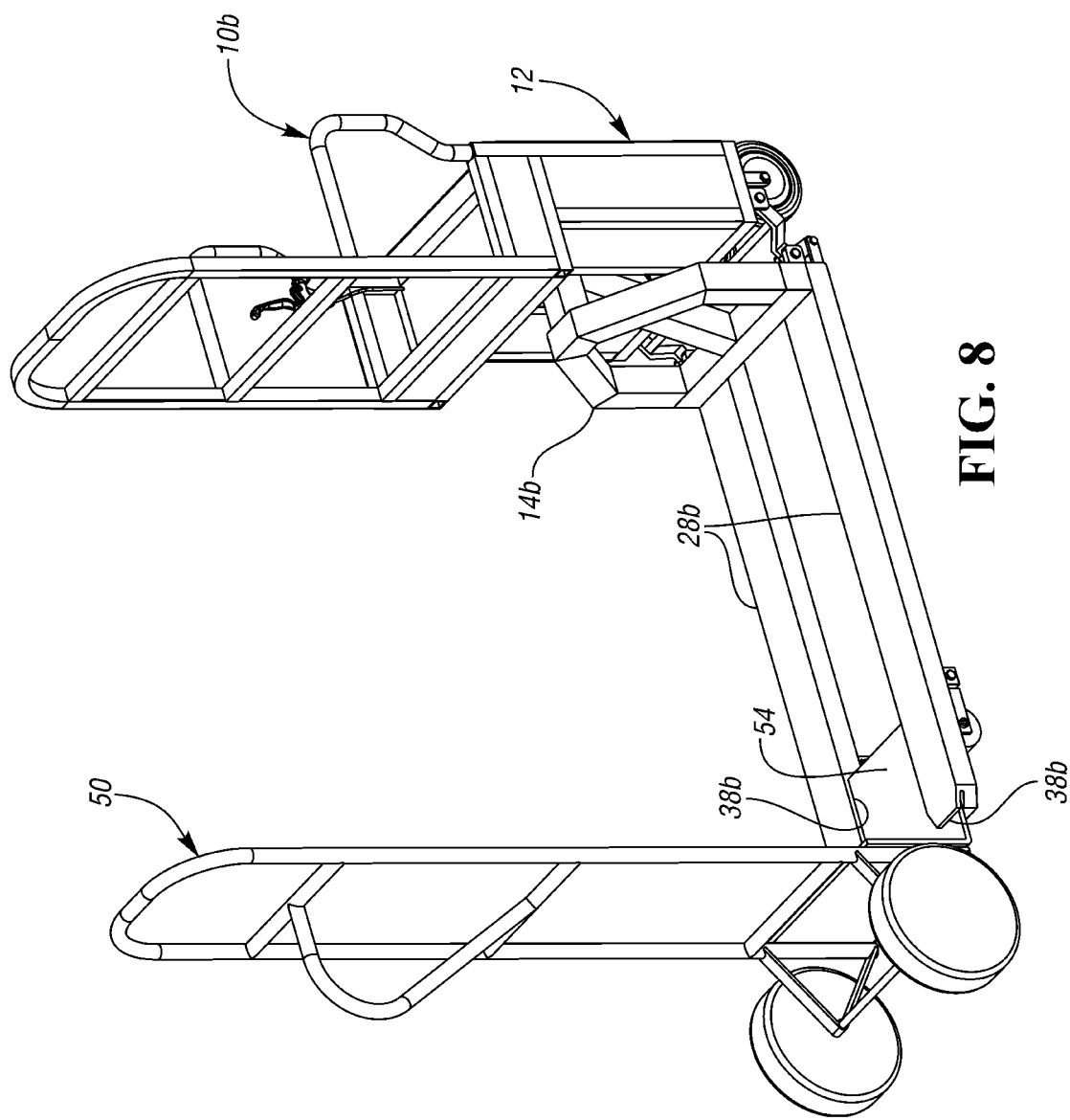
FIG. 8 shows the hand cart secured to the front of the tines of the pallet sled of FIG. 6.

As shown in FIG. 8, the base 54 of the hand cart 50 can be received in the forward slots 38b of the tines 28b. Preferably the forward slots 38b are slightly higher than the thickness of the base 54, so that the hand cart 50 can be received and retained in position.

Figure 9:
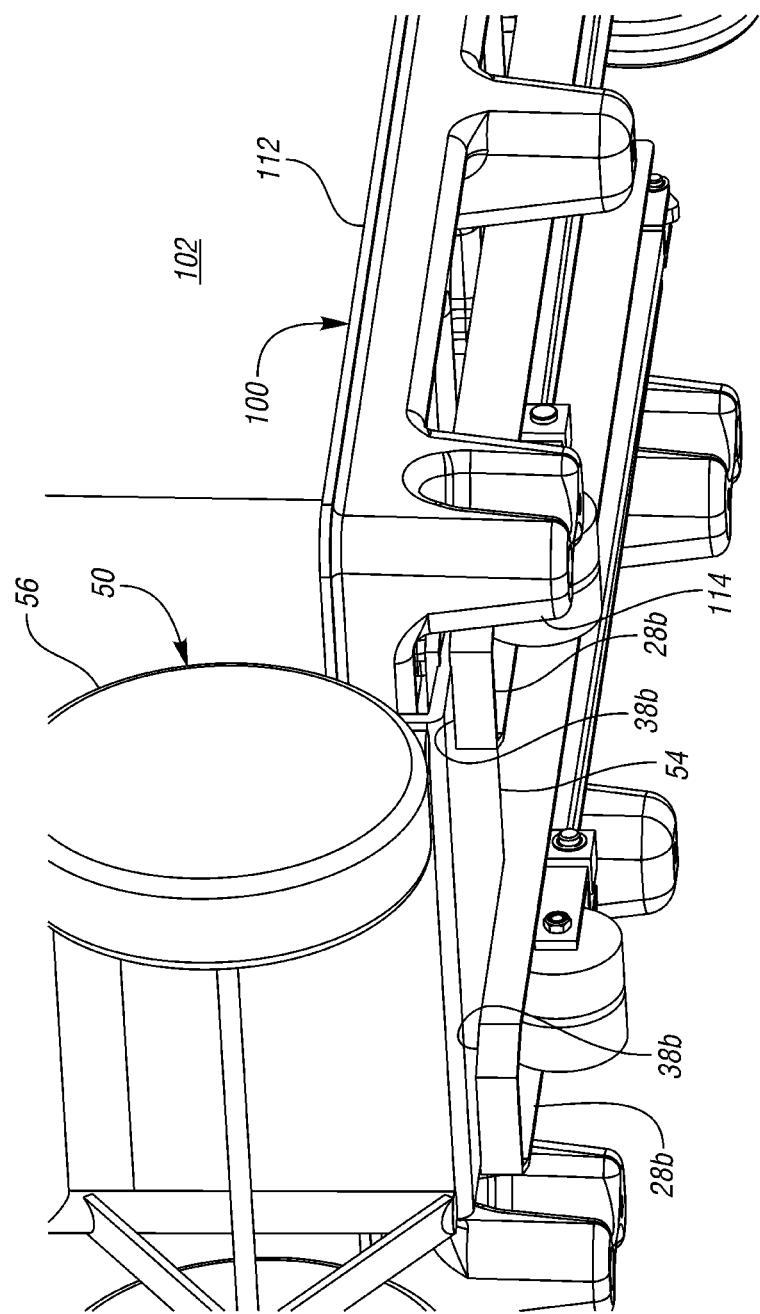
FIG. 9 is a front perspective view of the hand cart and pallet sled of FIG. 8, with goods stacked on the pallet received on the pallet sled.

Referring to FIG. 9, the pallet 100 and goods 102 can be stacked on the upper surfaces of the tines 28b. Of course, this would typically occur before the base 54 of the cart 50 is received in the forward slots 38b at the forward ends of the tines 28b.

Figure 10:
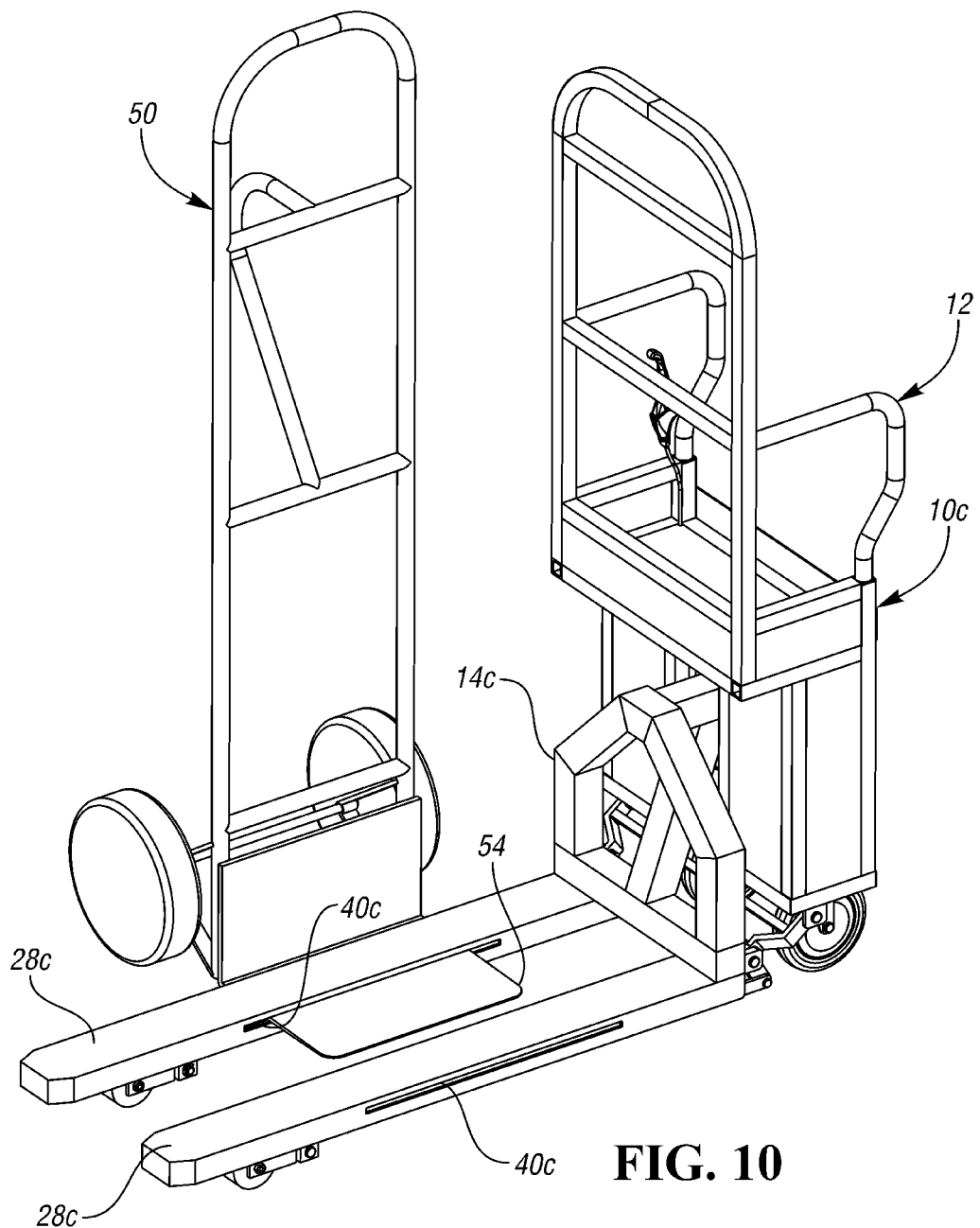
FIG. 10 is a perspective view of a pallet sled according to a third embodiment with the hand cart received in one of the tines.

FIG. 10 shows a sled 10c according to a third embodiment, with another alternate tine assembly 14c. The fork tines 28c each include a horizontal central slot 40c extending through a central area of the tine 28c (such as a mid-point lengthwise). The base 54 of the cart 50 can be inserted through one of the central slots 40c (again typically after a loaded pallet 100 (not shown) is placed on the tines 28c).

Figure 11:
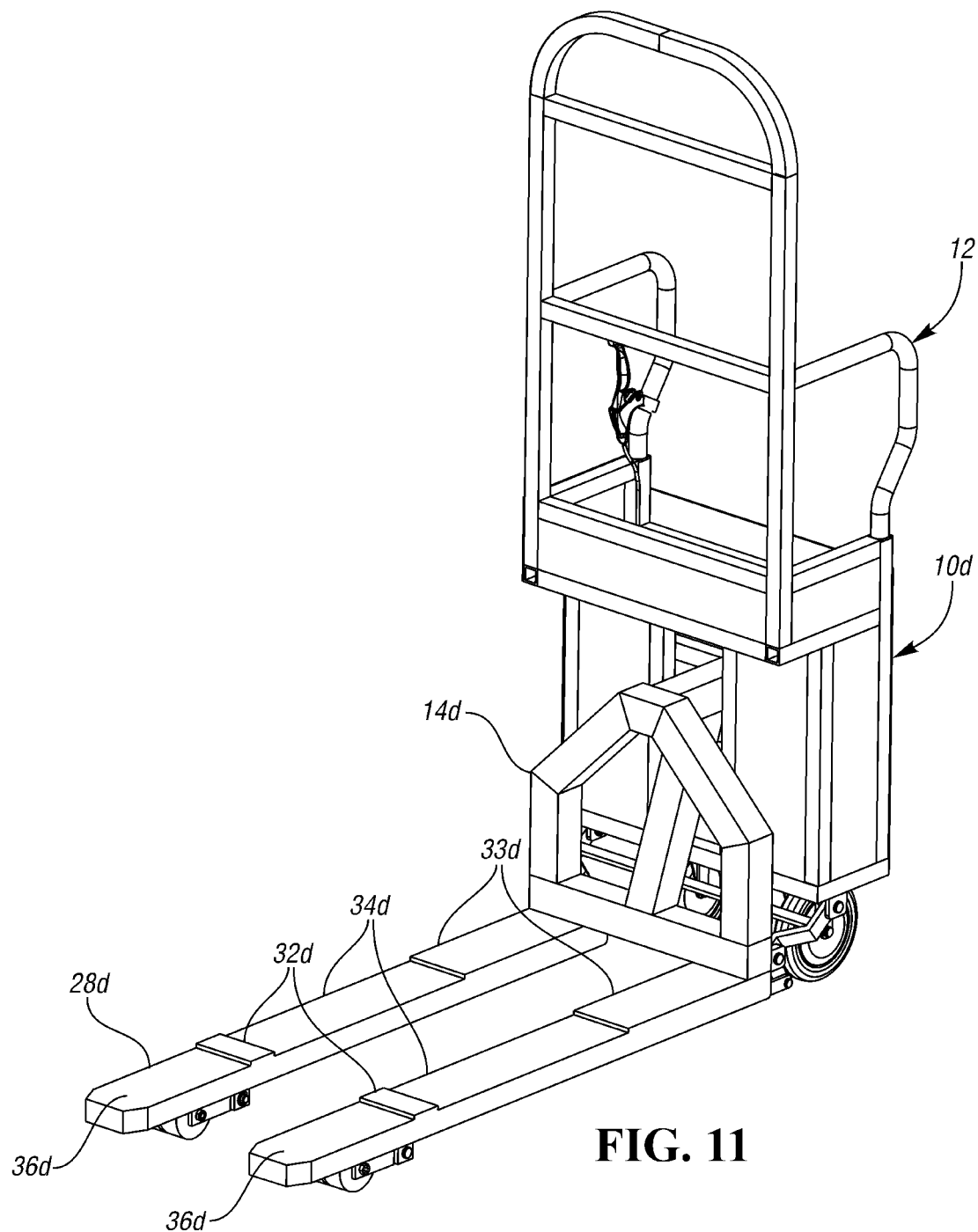
FIG. 11 is a perspective view of a pallet sled according to a fourth embodiment.
Figure 12:
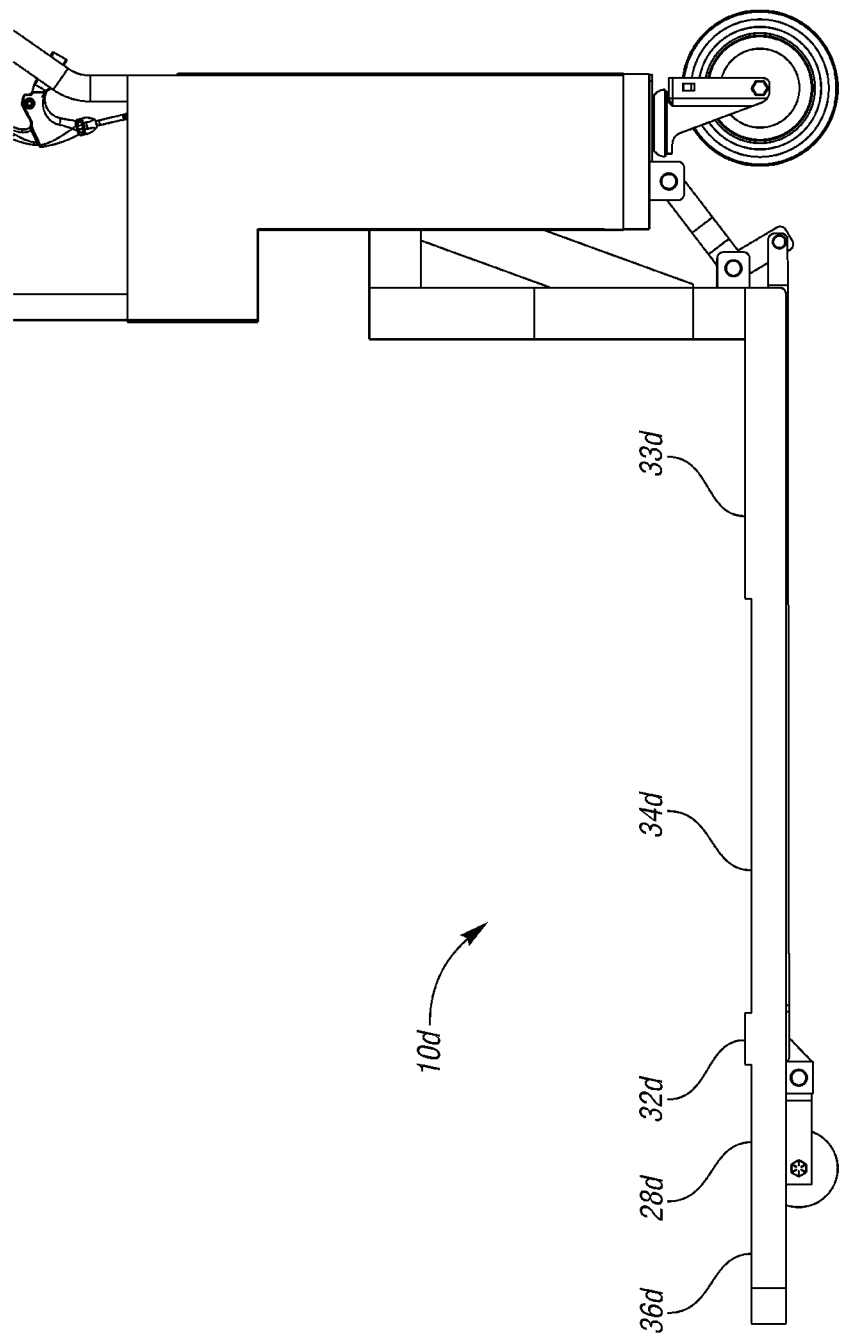
FIG. 12 is a side view of the pallet sled of FIG. 11.
Figure 13:
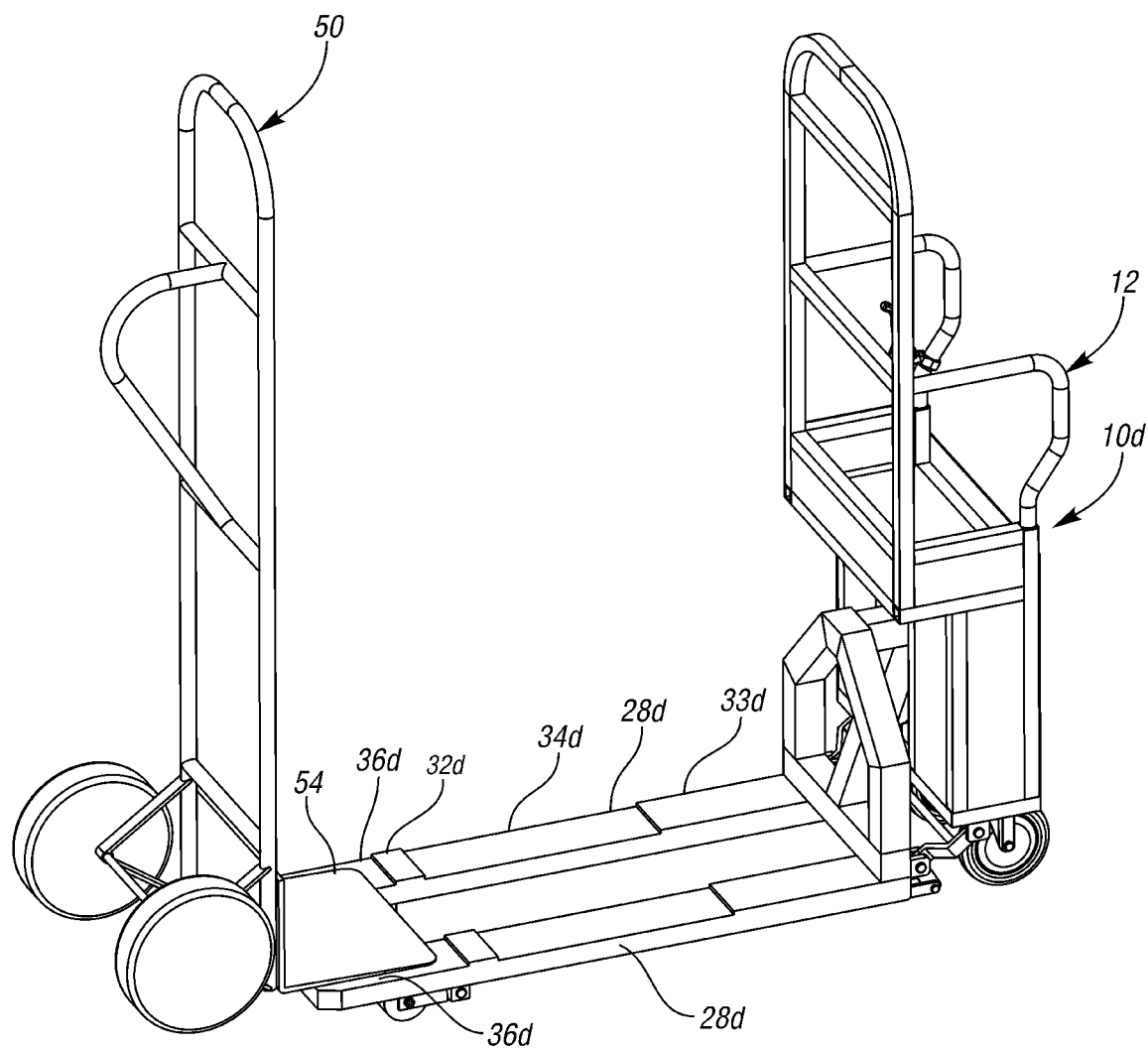
FIG. 13 shows the hand cart in place on the front of the tines of the pallet sled of FIG. 11.
Figure 14:
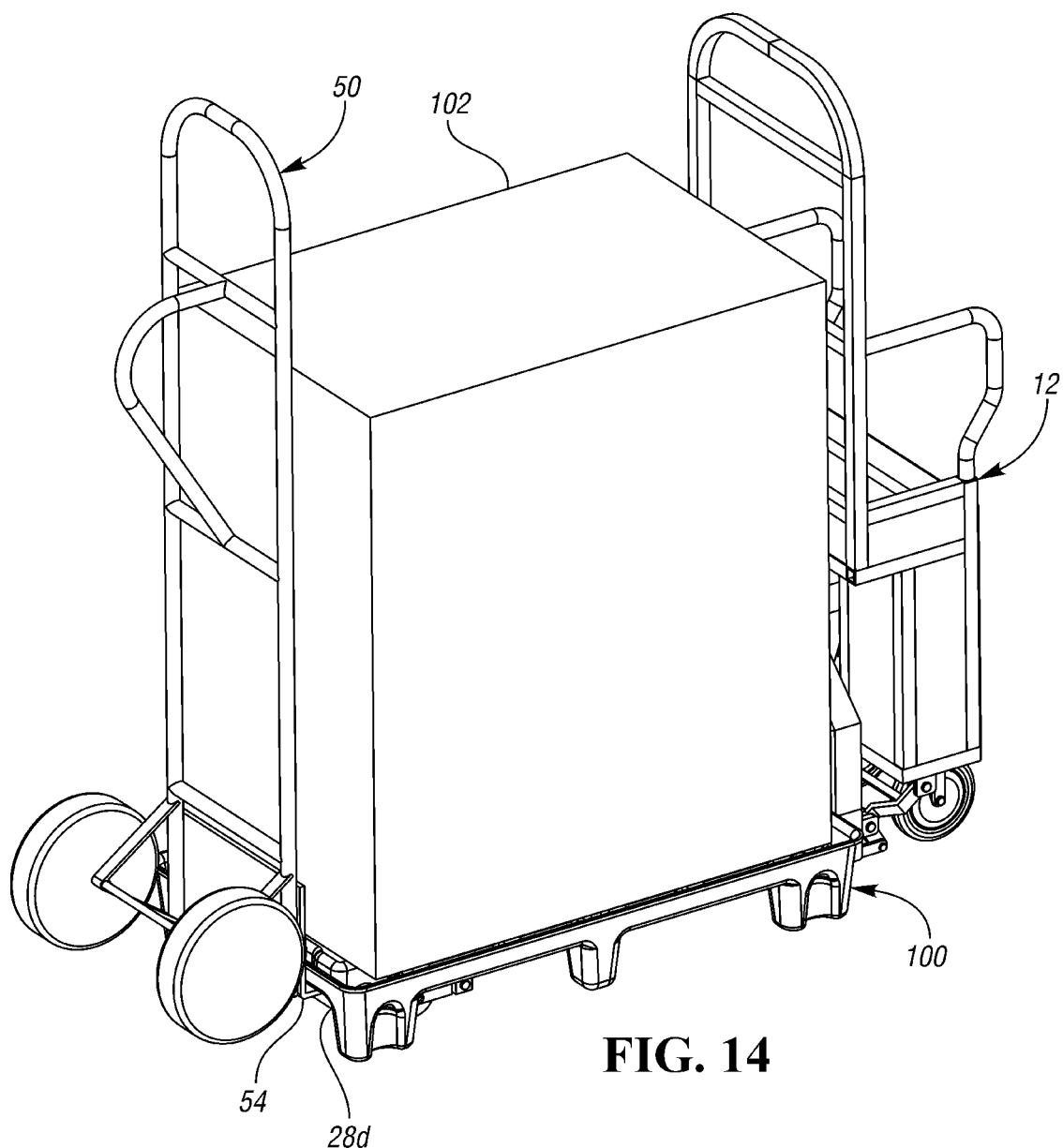
FIG. 14 shows the pallet with goods supported on the pallet sled and hand cart of FIG. 13.
Figure 15:
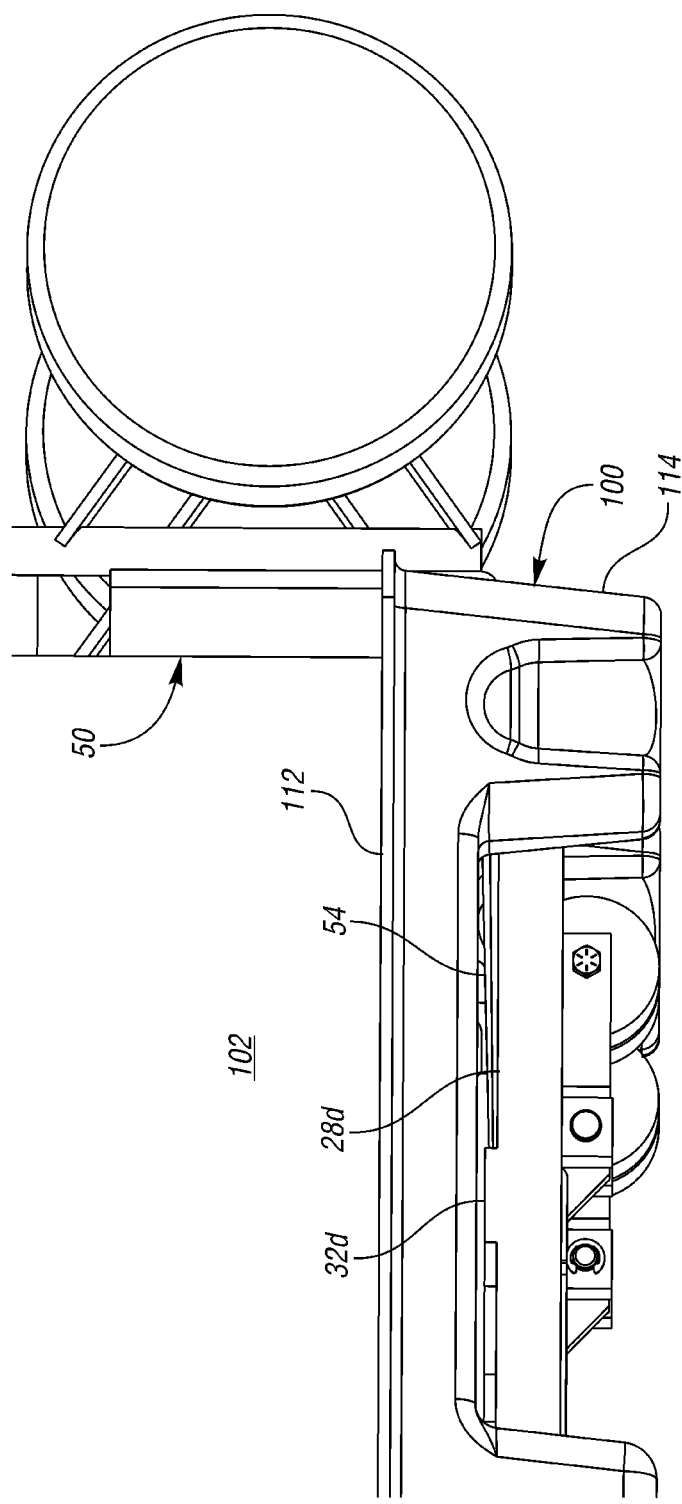
FIG. 15 is an enlarged view of the front of the pallet sled, pallet, goods and hand cart of FIG. 14.
Figure 16:
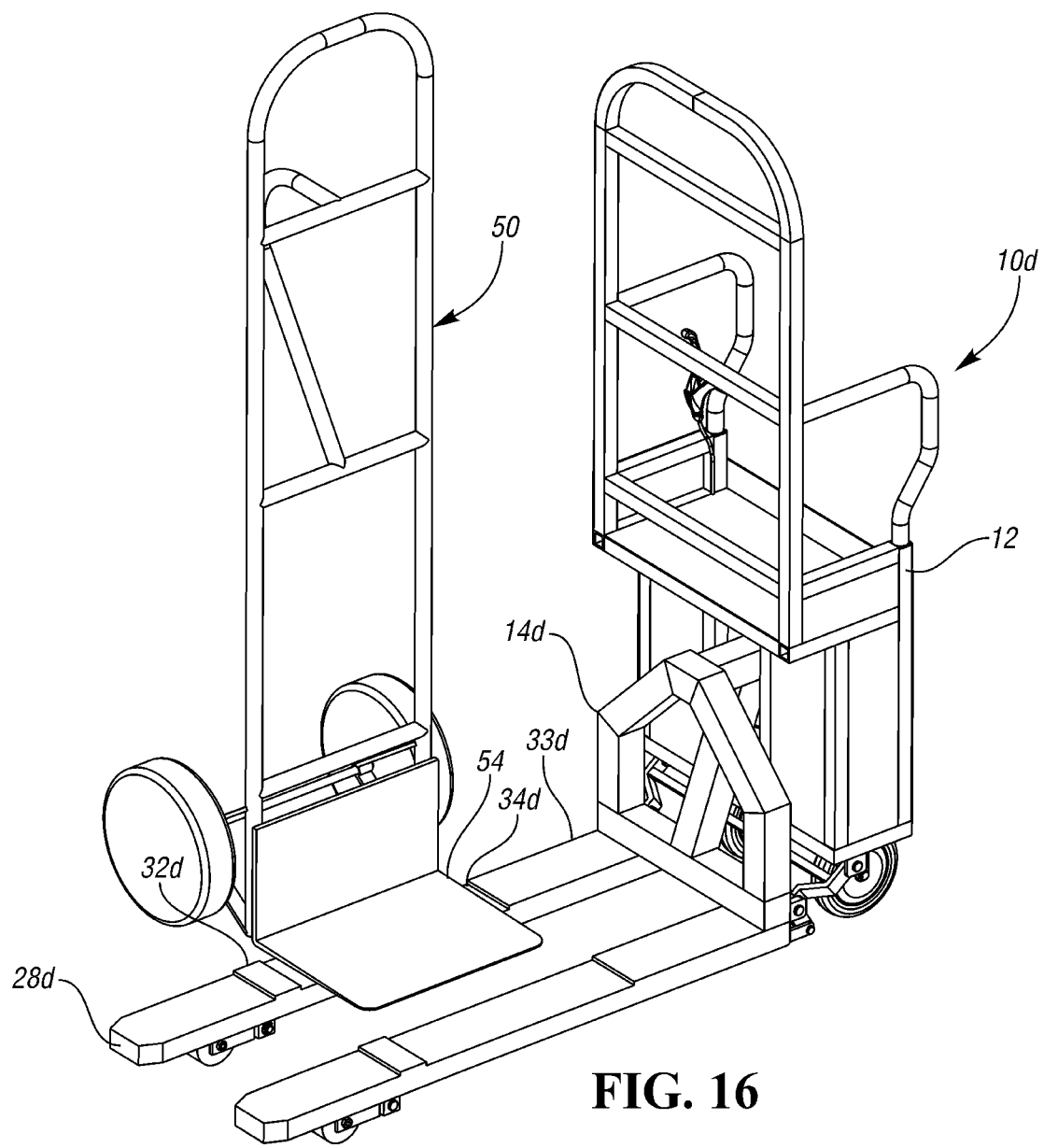
FIG. 16 is a perspective view of the hand cart and pallet sled of FIG. 13 with the hand cart in a side position.
Figure 17:
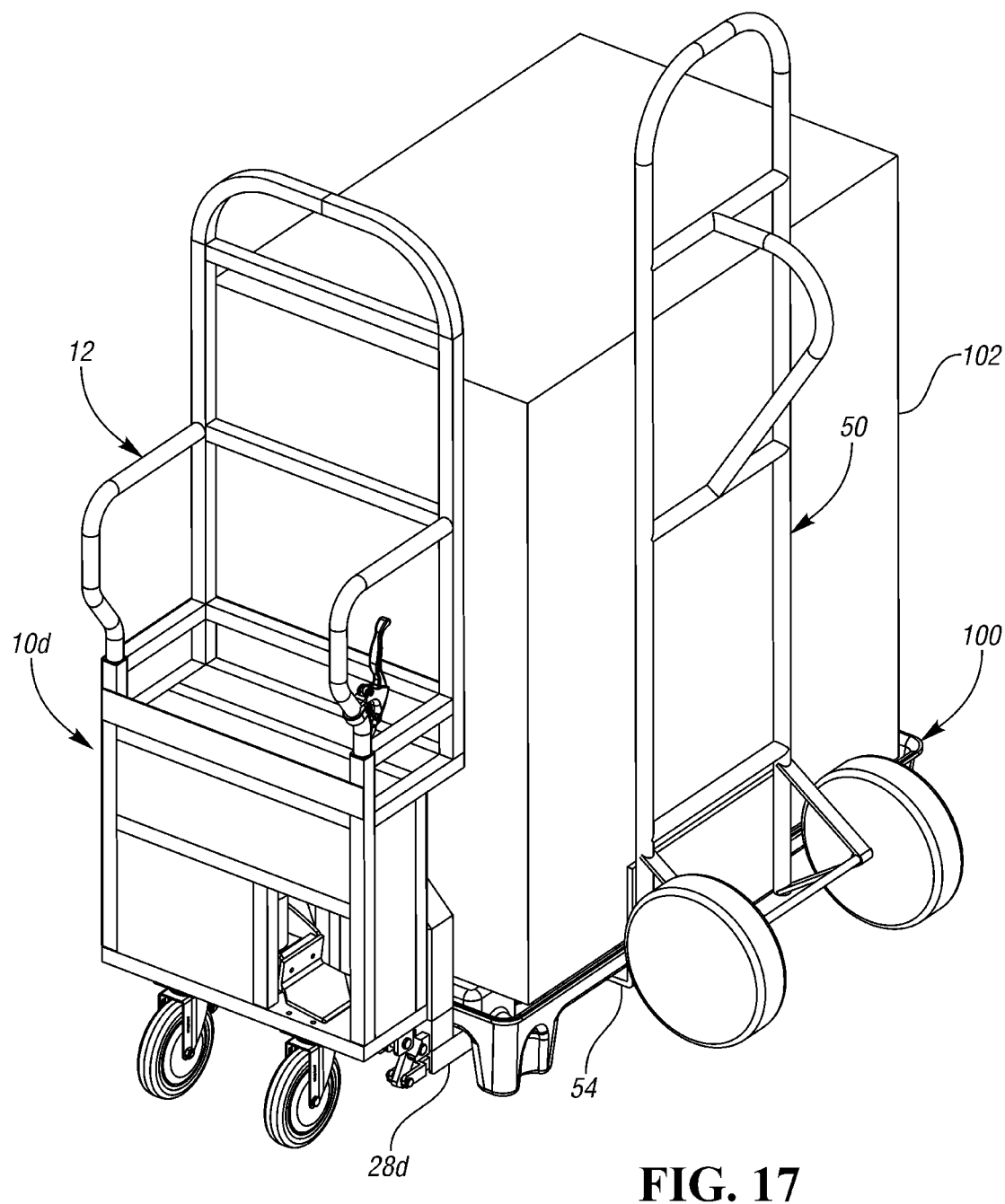
FIG. 17 shows the hand cart and pallet sled of FIG. 16 with the pallet and goods stacked thereon.

FIGS. 11 and 12 show a sled 10d according to a fourth embodiment with another alternate tine assembly 14d. The fork tines 28d each include a raised rear area 33d and a forward spacer 32d, defining a central recessed area 34d therebetween. A forward recessed area 36d is defined forward of each spacer 32d. The base 54 can be received on the forward recessed area 36d (FIGS. 13-15) or in the central recessed area 34d (FIGS. 16-17).

It should also be noted that two or more of the above features from the above embodiments could be provided on a single set of fork tines. For example, the spacers 32a, the forward slots 38b and the central slots 40c could all be provided on the same set of fork tines for more options for carrying the cart 50.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. In combination:
a pallet sled having a sled base having wheels, the pallet sled further including a fork tine assembly extending from the sled base, the fork tine assembly including a pair of fork tines, at least one of the pair of fork tines configured to be secured directly to a horizontal planar base of a hand cart projecting forwardly from a frame of the hand cart and having two wheels mounted rearwardly of the frame; and
the hand cart, wherein the horizontal, planar base of the hand cart is secured to the at least one of the pair of fork tines and wherein the frame of the cart extends upward vertically to a handle portion and wherein the horizontal, planar base projects forwardly from a lower portion of the frame and the two wheels are mounted to an axis rearward of the lower portion of the frame and higher than the horizontal, planar base.

2. The pallet sled and pallet of claim 1 wherein the at least one of the pair of fork tines includes an uppermost surface from which at least one spacer projects upward, thereby defining a recess into which the base of the hand cart can be received.

3. The pallet sled and pallet of claim 1 wherein the at least one of the pair of fork tines is configured to receive the base of the hand cart below a pallet lifted by the pallet sled.

4. The pallet sled and hand cart of claim 1 further in combination with a pallet supported on the fork tines above the base of the hand cart.

5. The pallet sled and hand cart of claim 1 wherein the at least one of the pair of fork tines includes an uppermost surface having a recess formed therein, wherein the recess is configured to receive the base of the hand cart.

6. A pallet sled comprising:
a sled base having first wheels; and
a fork tine assembly extending from the sled base, the fork tine assembly including first and second fork tines extending from the sled base to free ends supported by second wheels, wherein the first fork tine is configured to be secured to a horizontal, planar base projecting away from a frame of a hand cart having only two wheels, wherein the first and second fork tines each include a horizontal slot formed at the free ends thereof, wherein the slots are generally parallel to upper support surfaces of the first and second fork tines, wherein the slots are capable of receiving the horizontal, planar base of the hand cart therein.

7. The pallet sled of claim 6 wherein the first fork tine is configured to be secured to the hand cart while a pallet is supported on the first and second tines.

8. A pallet sled comprising:
a sled base having wheels; and
a fork tine assembly extending from the sled base, the fork tine assembly including a pair of fork tines, at least one of the pair of fork tines including a slot formed therein, the slot configured to receive a base of a hand cart therein.

9. The pallet sled of claim 8 wherein the slot extends through the at least one of the pair of fork tines.

10. The pallet sled of claim 9 in combination with the hand cart, wherein the base of the hand cart extends through the slot.

11. The pallet sled of claim 10 in combination with the hand cart, wherein the base of the hand cart is received in the slot.

12. The pallet sled of claim 8 wherein the slot is formed in a longitudinal end of the at least one of the pair of fork tines.

13. The pallet sled of claim 8 wherein the slot is formed in a longitudinal end of each of the pair of fork tines and is generally parallel to upper support surfaces of the pair of fork tines.

14. The pallet sled of claim 8 wherein the slot extends through the at least one of the pair of fork tines and is generally parallel to an upper support surface of the at least one of the pair of fork tines.

15. The pallet sled of claim 8 in combination with the hand cart, wherein the base of the hand cart is received in the slot of the at least one of the pair of fork tines wherein the base of the hand cart is generally planar and extends forwardly from a lower portion of a vertical frame supported by only two wheels mounted rearwardly of the lower portion of the vertical frame.

16. The pallet sled and hand cart of claim 15 further in combination with a pallet supported on the fork tines above the base of the hand cart.

17. The pallet sled of claim 8 wherein the slot is generally parallel to upper support surfaces of the pair of fork tines and wherein the slot extends between the upper support surface and a lowermost surface of the at least one of the pair of fork tines.

18. The pallet sled of claim 16 wherein the slot is generally parallel to upper support surfaces of the pair of fork tines, wherein the pallet is supported on the support surfaces of the pair of fork tines.

* * * * *